US010348427B2

(12) United States Patent
Blesser

(10) Patent No.: US 10,348,427 B2
(45) Date of Patent: *Jul. 9, 2019

(54) OPTIMIZING PARAMETERS IN DEPLOYED SYSTEMS OPERATING IN DELAYED FEEDBACK REAL WORLD ENVIRONMENTS

(71) Applicant: TLS Corp., Cleveland, OH (US)

(72) Inventor: Barry Blesser, Belmont, MA (US)

(73) Assignee: TLS Corp., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/653,665

(22) Filed: Jul. 19, 2017

(65) Prior Publication Data

US 2017/0346585 A1 Nov. 30, 2017

Related U.S. Application Data

(63) Continuation of application No. 14/820,615, filed on Aug. 7, 2015, now Pat. No. 9,742,511, which is a (Continued)

(51) Int. Cl.
*G10L 19/00* (2013.01)
*H04N 1/00* (2006.01)
(Continued)

(52) U.S. Cl.
CPC ........... *H04H 60/58* (2013.01); *G10L 19/018* (2013.01); *H04H 20/31* (2013.01); *H04H 60/45* (2013.01);
(Continued)

(58) Field of Classification Search
CPC ......... G10L 19/00; G10L 19/08; G10L 25/00; G10L 25/48; G10L 25/57; H04N 1/00;
(Continued)

(56) References Cited

U.S. PATENT DOCUMENTS 5,029,217 A 7/1991 Chabries et al.
5,450,490 A 9/1995 Jensen et al.
(Continued)

FOREIGN PATENT DOCUMENTS

WO 2006116270 A2 11/2006

OTHER PUBLICATIONS

Arbitron, Critical Band Encoding Technology Audio Encoding System From Arbitron; Document 1050-1054; Revision E; pp. 1-27; Feb. 2008.

(Continued)

*Primary Examiner* — Paras D Shah
(74) *Attorney, Agent, or Firm* — Renner, Otto, Boisselle & Sklar, LLP

(57) ABSTRACT

Determining effect of changes in parameters may include, during a time interval, rotating from setting a first parameter to a first value for a first time period, to setting the first parameter to a second value for a second time period such that the time interval includes multiple first time periods with the first parameter set to the first value sequenced with multiple second time periods with the first parameter set to the second value; obtaining, for the time interval, a first set of ratings corresponding to the first time periods and a second set of ratings corresponding to the second time periods; averaging, for the time interval, the first set of ratings to a first average rating and the second set of ratings to a second average rating; and correlating the first average rating to the first value and the second average rating to the second value.

24 Claims, 8 Drawing Sheets

Related U.S. Application Data continuation of application No. 14/686,716, filed on Apr. 14, 2015, now Pat. No. 9,130,685.

(51) Int. Cl.

| | |
|---|---|
| ***H04H 60/00*** | (2009.01) |
| ***H04H 60/58*** | (2008.01) |
| ***H04H 60/66*** | (2008.01) |
| ***H04H 20/31*** | (2008.01) |
| ***H04H 60/45*** | (2008.01) |
| ***G10L 19/018*** | (2013.01) |
| *H04H 60/31* | (2008.01) |

(52) U.S. Cl.

CPC ............ *H04H 60/66* (2013.01); *G10L 19/00* (2013.01); *H04H 60/31* (2013.01); *H04H 2201/50* (2013.01)

(58) Field of Classification Search

CPC .. H04N 1/3232; H04N 1/32331; H04H 60/00; H04H 60/25; H04H 60/27; H04H 60/29; H04H 60/33; H04H 60/35; H04H 60/38; H04H 60/48; H04H 60/61; H04H 2201/50

See application file for complete search history.

(56) References Cited

U.S. PATENT DOCUMENTS

| | | | | |
|---|---|---|---|---|
| 5,483,276 | A | 1/1996 | Brooks et al. | |
| 5,574,962 | A | 11/1996 | Fardeau et al. | |
| 5,574,963 | A | 11/1996 | Weinblatt et al. | |
| 5,579,124 | A | 11/1996 | Aija et al. | |
| 5,581,800 | A | 12/1996 | Fardeau et al. | |
| 5,764,763 | A | 6/1998 | Jensen et al. | |
| 5,787,334 | A | 7/1998 | Fardeau et al. | |
| 6,421,445 | B1 | 7/2002 | Jensen et al. | |
| 6,571,144 | B1 | 5/2003 | Moses et al. | |
| 6,621,881 | B2 | 9/2003 | Srinivasan | |
| 6,674,876 | B1 | 1/2004 | Hannigan et al. | |
| 6,683,958 | B2 | 1/2004 | Petrovic | |
| 6,845,360 | B2 | 1/2005 | Jensen et al. | |
| 6,862,355 | B2 | 3/2005 | Kolessar et al. | |
| 6,871,180 | B1 | 3/2005 | Neuhauser et al. | |
| 6,996,237 | B2 | 2/2006 | Jensen et al. | |
| 7,003,790 | B1 | 2/2006 | Inoue et al. | |
| 7,031,491 | B1 | 4/2006 | Donescu et al. | |
| 7,222,071 | B2 | 5/2007 | Neuhauser et al. | |
| 7,239,981 | B2 | 7/2007 | Kolessar et al. | |
| 7,316,025 | B1 | 1/2008 | Aijala et al. | |
| 7,395,211 | B2 | 7/2008 | Watson et al. | |
| 7,471,987 | B2 | 12/2008 | Crystal et al. | |
| 7,483,835 | B2 | 1/2009 | Neuhauser et al. | |
| 7,483,975 | B2 | 1/2009 | Kolessar et al. | |
| 7,640,141 | B2 | 12/2009 | Kolessar et al. | |
| 7,961,881 | B2 | 6/2011 | Jensen et al. | |
| RE42,627 | E | 8/2011 | Neuhauser et al. | |
| 8,099,285 | B2 | 1/2012 | Smith et al. | |
| 8,869,187 | B2 | 10/2014 | Wright et al. | |
| 2002/0078469 | A1 * | 6/2002 | Kano | H04H 20/76 725/139 |
| 2002/0138830 | A1 | 9/2002 | Nagaoka et al. | |
| 2003/0128861 | A1 | 7/2003 | Rhoads | |
| 2003/0219143 | A1 | 11/2003 | Moskowitz et al. | |
| 2003/0231785 | A1 | 12/2003 | Rhoads et al. | |
| 2005/0157907 | A1 | 7/2005 | Reed et al. | |
| 2006/0010470 | A1 * | 1/2006 | Kurosaki | H04H 20/76 725/46 |
| 2007/0143777 | A1 | 6/2007 | Wang | |
| 2008/0275697 | A1 | 11/2008 | Kentish et al. | |
| 2009/0076907 | A1 | 3/2009 | Litwin et al. | |
| 2009/0144784 | A1 | 6/2009 | Li et al. | |
| 2009/0262932 | A1 | 10/2009 | Petrovic | |
| 2010/0131970 | A1 | 5/2010 | Falcon | |
| 2011/0093104 | A1 | 4/2011 | Blesser | |
| 2011/0158187 | A1 * | 6/2011 | Komamura | H04W 72/0486 370/329 |
| 2011/0288907 | A1 * | 11/2011 | Harvey | G06Q 10/0639 705/7.29 |
| 2011/0321078 | A1 * | 12/2011 | Hoshen | H04N 21/252 725/14 |
| 2012/0159528 | A1 | 6/2012 | Toney, Jr. | |
| 2012/0274459 | A1 | 11/2012 | Jaisimha et al. | |
| 2013/0054350 | A1 | 2/2013 | Camps | |
| 2013/0305273 | A1 * | 11/2013 | Hadfield | H04N 21/44204 725/14 |
| 2014/0073276 | A1 | 3/2014 | Iyer et al. | |
| 2014/0150003 | A1 * | 5/2014 | Doe | H04N 21/25883 725/9 |
| 2017/0155959 | A1 * | 6/2017 | Vinson | H04N 21/4667 |

OTHER PUBLICATIONS

Blesser, Barry, Director of Engineering, 25-Seven Systems, Inc.; Technical Properties of Arbitron's PPM System; pp. 1-8; Aug. 18, 2009.

International Search Report and Written Opinion dated Mar. 13, 2015 for corresponding International Application No. PCT/US2014/068485.

Non-Final Office Action dated Jan. 24, 2014 for U.S. Appl. No. 14/097,716.

Non-Final Office Action dated Feb. 20, 2014 for U.S. Appl. No. 14/145,681.

Non-Final Office Action dated Aug. 11, 2014 for U.S. Appl. No. 14/216,041.

Non-Final Office Action dated Oct. 25, 2016 for U.S. Appl. No. 14/820,615.

Final Office Action dated Feb. 15, 2017 for U.S. Appl. No. 14/820,615.

* cited by examiner

OPTIMIZING PARAMETERS IN DEPLOYED SYSTEMS OPERATING IN DELAYED FEEDBACK REAL WORLD ENVIRONMENTS

BACKGROUND

A wide variety of systems, such as systems used with audio and video media, need parameters optimized for the system's particular application. While the parameter optimization process is expected to be part of the design process and while the deployed design is expected to have been extensively tested in a wide range of scenarios, a class of applications exists in which parameter optimization can only be done after the system has been deployed, i.e., when operating in a real world application. In these situations, performance may depend on properties of the environment and these properties may be unknowable at design time and may even change as the system is being used. Different stakeholders may place or operate a particular system in unique statistical contexts that could not have been known by the original designers. A designer can make assumptions, but there may be no way to know when and if that assumption is valid.

One such example of this problem is found in audio watermarking technology used in broadcasting where the goal is to identify and count the number of listeners to a particular program as a means of evaluating the ad revenue that should be assigned to that program. There is no perfect watermarking system because one cannot simultaneously optimize all parameters. Consider the following property list: decodability of watermark, audibility of watermark, size of the information payload, response time to acquire the watermark codes, battery life if portable, the cost of decoders as measured in compute complexity, tolerance to signal degradation during transmission or encoding, dependency on the program material, and the acoustics of the listener's environment. Each application requires its own optimization and most applications are unique to the particulars of that user. Each broadcast station may well require its own optimization that by definition will deviate from some reference ideal that is a generic solution. The developers cannot do such optimization. Rather each station must tune to the properties of their own system. This means that each station must have a way of measuring the degree to which the current parameter set is or is not at an optimum.

But, in watermarking systems used in broadcasting to identify and count the number of listeners to a particular program, the broadcasted watermarked signal is received by listeners in their local environment, which may contain many other real world sound sources (e.g., the sound of engines, people talking, crowds, etc.) in addition to the broadcast. The local decoder, which has the responsibility of extracting the watermarking payload, is faced with the challenge of operating in an environment where both the program being transmitted and the sounds local to the decoder may undermine the performance of the decoder.

Even after the decoder receives and decodes the watermarked signal, the decoded payload for each listener is not immediately sent back to the radio station. The decoded payload is accumulated, perhaps once per day, and sent to the home office where an additional set of rules is applied to approximate the number of real listeners, the ratings. The final reports of listeners are eventually distributed back to the subscriber stakeholders, which may include advertising agencies, station sales staff, and others. This process can take days and it may take weeks for the ratings reports to be available. Significant delays are introduced.

Because of the long delay, optimization based on ratings is extremely difficult. Consider that a broadcaster sets a particular parameter to 17, and then a week later after getting a report, sets the parameter to 19 to see if that change influences the statistics. During the delay, a lot may have changed: school vacation may change the available listeners, a snow storm shuts down the number of drivers commuting to work, a world-series sport events takes place, the program director changes the type of audio being broadcast, and so on. In other words, if the change from 17 to 19 made a difference, there is no way to know if that change was produced by unrelated events or if the change resulted from the new parameter value. The statistics are time varying and arise from numerous unknown events. Stations may speculate, but they have no way to know if their guesses are relevant or accurate. Because the process of measuring listeners requires averaging to reduce data noise, and because averaging requires a long time span, the other variables also influence the result.

SUMMARY OF THE INVENTION

The present disclosure provides methods and systems that address the problem of optimizing parameters in deployed systems operating in delayed feedback, real world environments. The methods and systems disclosed herein prevent multi-dimensional unrelated changes from influencing the ability to correlate intended parameter changes to ratings results. This allows users to optimize the system while preserving averaging to reduce noise.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Although the present disclosure describes various embodiments in the context of watermarking a radio station's audio programming to identify which stations people are listening to, it will be appreciated that this exemplary context is only one of many potential applications in which aspects of the disclosed systems and methods may be used. For example, the disclosed systems and methods may be applied to optimize many other parameters (e.g., loudness, equalization, color intensity, etc.) that affect broadcasted audio or video signals and listener's behavior in response to those parameters. The principles of correlation disclosed herein may be used to correlate any such parameter that affects broadcasted audio or video signals to ratings results. The disclosed systems and methods may also be applied to optimize parameters of deployed systems operating in delayed feedback, real world environments outside of the broadcasting context. For example, the disclosed systems and methods may be applied to optimize product offerings based on consumer behavior, etc. The principles of correlation disclosed herein may be used to correlate any such parameter that affects consumer behavior to ratings results.

Figure 1:
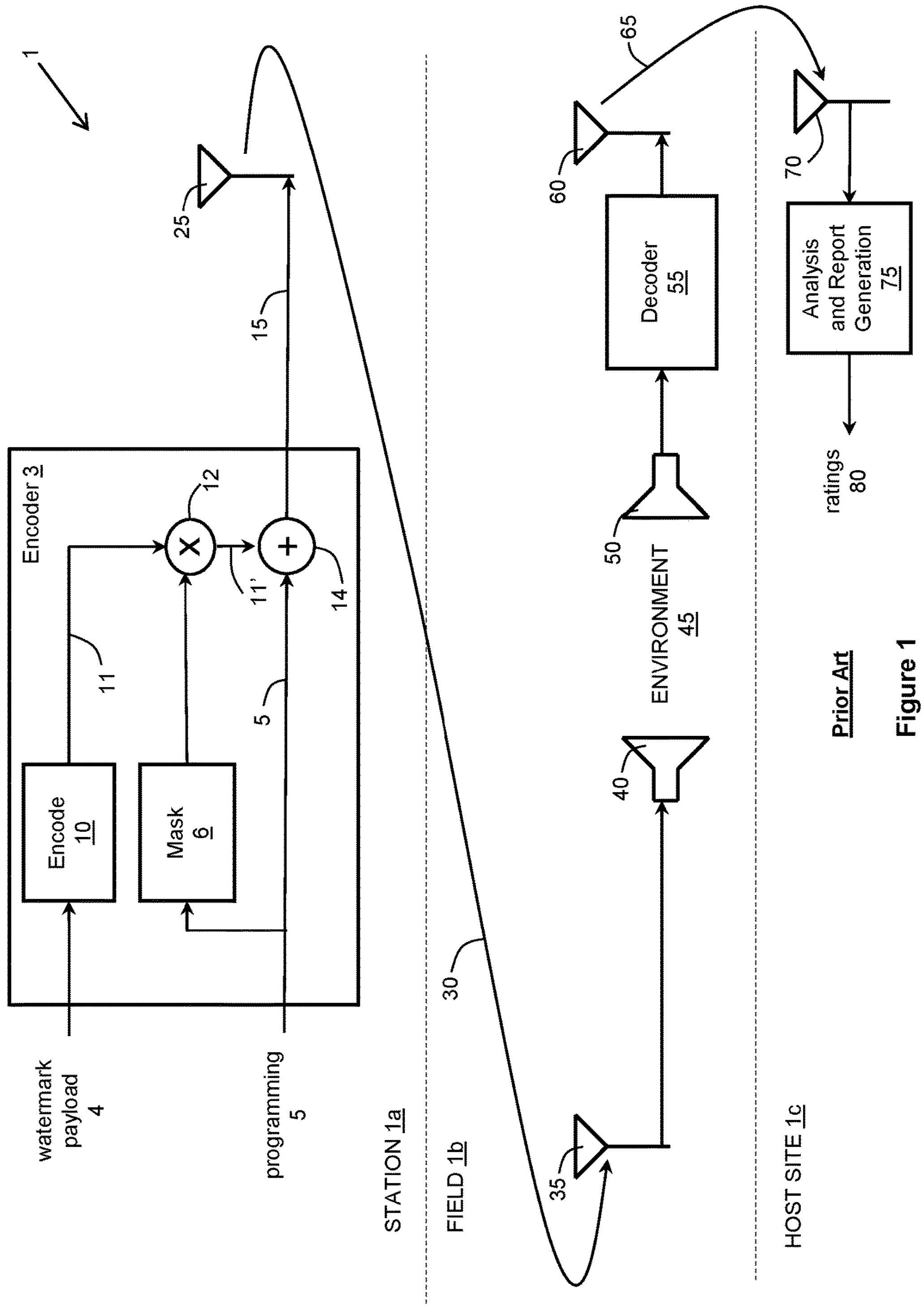
Prior Art Figure 1
FIG. 1 illustrates a simplified block diagram of an exemplary prior art system for electronic watermarking.

FIG. 1 illustrates a simplified block diagram of an exemplary prior art system 1 for electronic watermarking. The system 1 includes at least two portions, a portion at the station 1*a* and a portion at the field 1*b*. The station 1*a* corresponds to the facilities where broadcasting takes place. The field 1*b* corresponds to the places where listeners listen to the broadcast. The field 1*b* could be a home, place of work, car, etc.

The main component of the watermarking system 1 at the station 1*a* is the encoder 3, which includes the masking analysis 6 and the watermarking encode 10. The encode 10 receives the watermark payload 4 including, for example, the station identification, the time of day, etc. and encodes it to produce the watermark signal 11. The encode 10 encodes this digital information in possibly an analog signal that will be added to the programming 5 someplace in the transmitter chain.

But the amount of watermarking that can be injected varies because the degree of masking depends on the programming 5, which may include, announcers, soft-jazz, hard-rock, classical music, sporting events, etc. Each audio source has its own distribution of energy in the time-frequency space and that distribution controls the amount of watermarking that can be injected at a tolerable level. The masking analysis process has embedded numerous parameters, which need to be optimized. The masking analysis 6 receives the programming signal 5 and analyses it to determine, for example, the timing and energy at which the watermark signal 11 will be broadcasted.

The output of the masking analysis 6 is provided to the multiplier 12 and its output is the adjusted watermarking signal 11'. The summer 14 receives the programming signal 5 and embeds the adjusted watermarking signal 11' onto the programming signal 5. The result is the output signal 15, which includes the information in the programming signal 5 and the adjusted watermarking signal 11'. The modulator/transmitter 25 at the station 1*a* broadcasts the transmission 30, which includes the information in the output signal 15, through the air, internet, satellite, etc.

In the field 1*b* the receiver/demodulator 35 receives and demodulates the broadcast transmission 30 and transmits a corresponding signal to be transduced by the loudspeaker 40 into the environment 45. The combination of the receiver/demodulator 35 and the loudspeaker 40 could be, for example, an AM/FM radio. The environment 45 may vary with the field 1*b* (e.g., home, place of work, car, etc.), the time of day (e.g., high traffic, low traffic), etc. The system 1 is an example of a deployed system operating in a real world environment where real world factors affect the performance of the system.

The transducer 50 (e.g., a microphone) receives the output of the loudspeaker 40 as modified by the environment 45 and transmits a corresponding signal to a decoder 55. The decoder 55 decodes the received signal to, hopefully, obtain the watermark or the information within the watermark. The decoder 55, which has the responsibility of extracting the watermarking payload, is faced with the challenge of operating in an environment where both the local sounds and the program being transmitted may undermine the performance of the decoder 55. The decoded payload for each listener is accumulated and, perhaps once per day, the transmitter 60 may then transmit any detected watermark or the information within the watermark.

The output of the decoder 55 and the signal 65 transmitted by the transmitter 60 include decoded information to be transported to analysis and report generation 75 at a host site 1*c* who is managing the watermarking system to identify the station to which the listener at the field 1*b* is listening. Although the transmitter 60 and the receiver 70 are shown as antennae in FIG. 1, transmission of the decoded information 65 may not be a broadcast, but may be instead a private communication via telephone, internet, email module, etc. The output of the analysis and report generation 75 are the ratings 80, which may take the form of a report. The final ratings 80 are eventually distributed back to the subscriber stakeholders, which may include advertising agencies, station sales staff, and others. This process can take days if not weeks for the ratings reports to be available. The system 1 is an example of a deployed system operating in a delayed feedback environment.

Because of the long delay, optimization is extremely difficult. Consider, for example, that a broadcaster sets a particular parameter to 17, and then a week later after getting a ratings report, sets the parameter to 19 to see if that change influences the statistics. During the delay, a lot may have changed: school vacation may change the available listeners, a snow storm shuts down the number of drivers commuting to work, a world-series sport events takes place, the program director changes the type of audio being broadcast, and so on. In other words, if the change from 17 to 19 made a difference, there is no way to know if that change was produced by unrelated events or if the change resulted from the new parameter value. The statistics are time-varying and arise from numerous unknown events. Stakeholders may speculate, but they have no way to know if their guesses are relevant or accurate. Because the process of measuring listeners requires averaging to reduce data noise, and because averaging requires a long time span, the other variables also influence the result. The system 1 is an example of a deployed system operating in a multi-dimensional variable environment.

Figure 2:
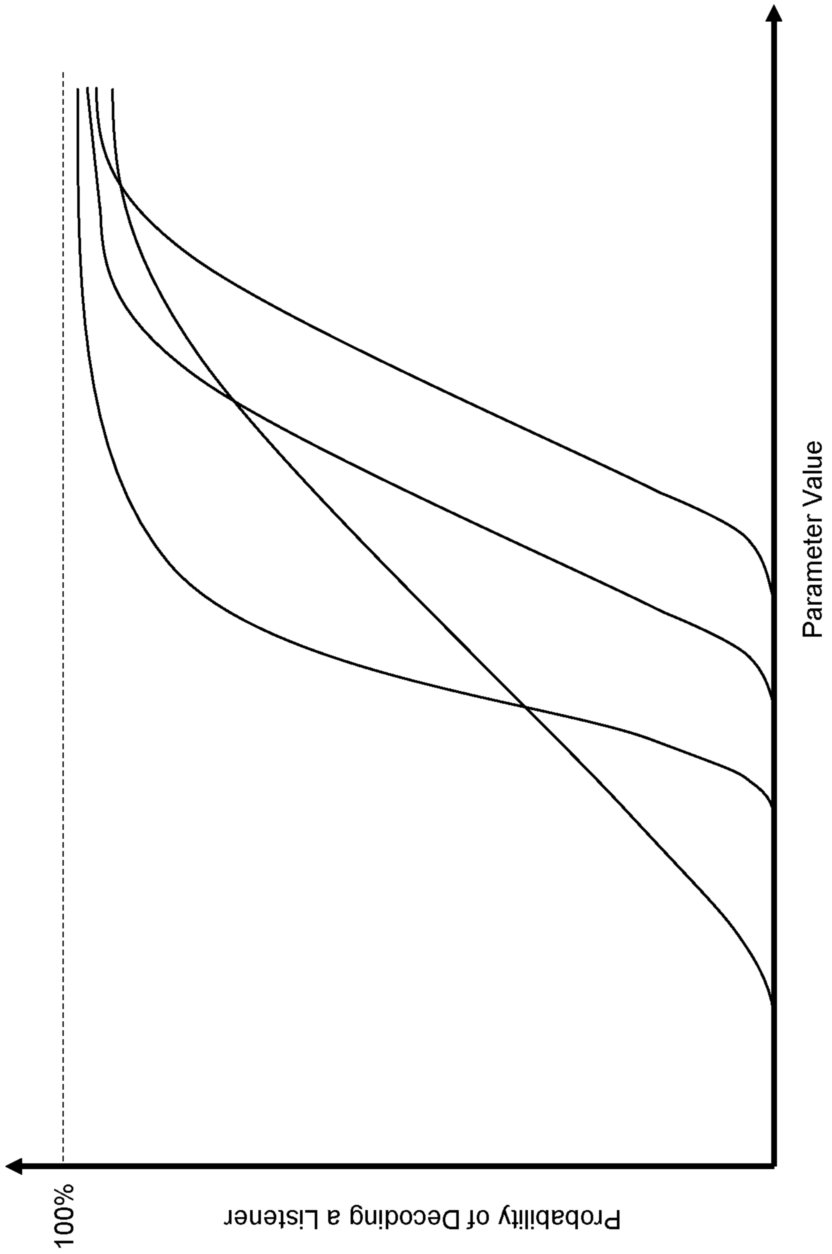
FIG. 2 illustrates an exemplary family of curves illustrating the probability of detecting a listener in a watermarking system as a function of values of a parameter.

FIG. 2 illustrates a family of curves that map the probability of correctly decoding a given listener's watermarking signal as a function of some parameter, such as, for example, watermarking signal strength. In FIG. 2, as the value of the parameter increases, the probability of detecting or decoding a listener increases. FIG. 2 shows a family of curves because of other variables such as the program material, the listening environment, etc. Each curve represents a given listener in a given context.

Figure 3:
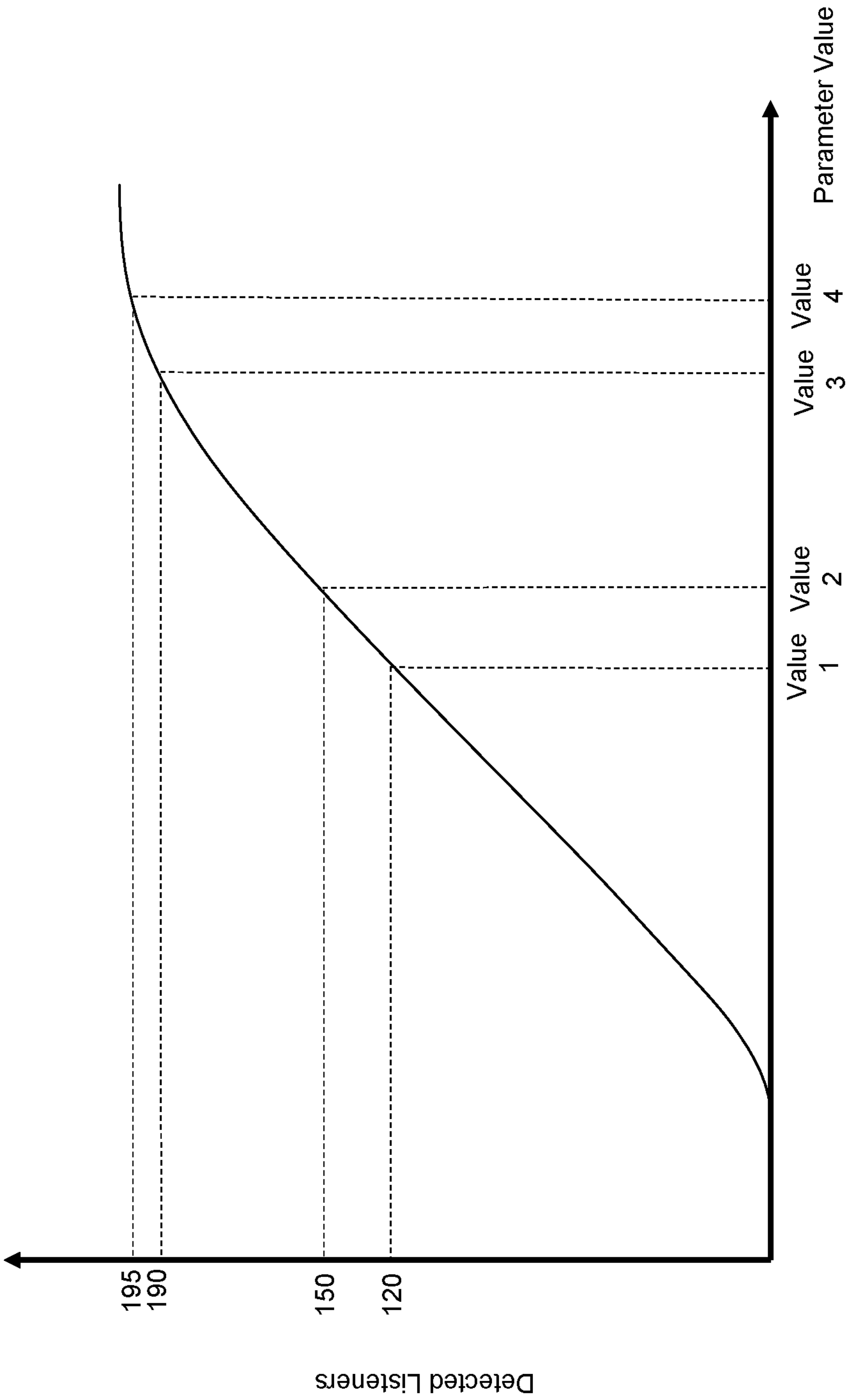
FIG. 3 illustrates an exemplary curve illustrating the total number of detected listeners, when all listeners are combined into a single number, as a function of values of a parameter.

FIG. 3 illustrates a curve that shows the total number of detected listeners, when all listeners are combined into a single number, as a function of values of a parameter. As the parameter value changes, the number of listeners detected will change. In the example of FIG. 3, the parameter set to a Value 1 results in 120 listeners being detected, the parameter set to a Value 2 results in 150 detected listeners, and so on. In FIG. 3, even the highest value for the parameter, Value 4, does not achieve detection of all of the listeners. Commonly, the parameter must be set at some extreme, and unacceptable, value to capture all listeners. For example, if the parameter is the watermarking energy, and, if a particular listener is located in a loud machine shop with a high level of mechanical noise, the injected watermarking energy would need to be extremely loud for the listener to be detected, which would be unacceptable to another listener sitting in his quiet home living room.

The curve of FIG. 3 will change from hour to hour, week to week, and from classical music to sporting events. But, stations need some way to visualize the shape of the curve of FIG. 3 in order to optimally set parameters. Stations need to know where the current value of parameters places them on the curve. This information would allow them to make a wise choice about increasing or decreasing one or more parameters.

Figure 4:
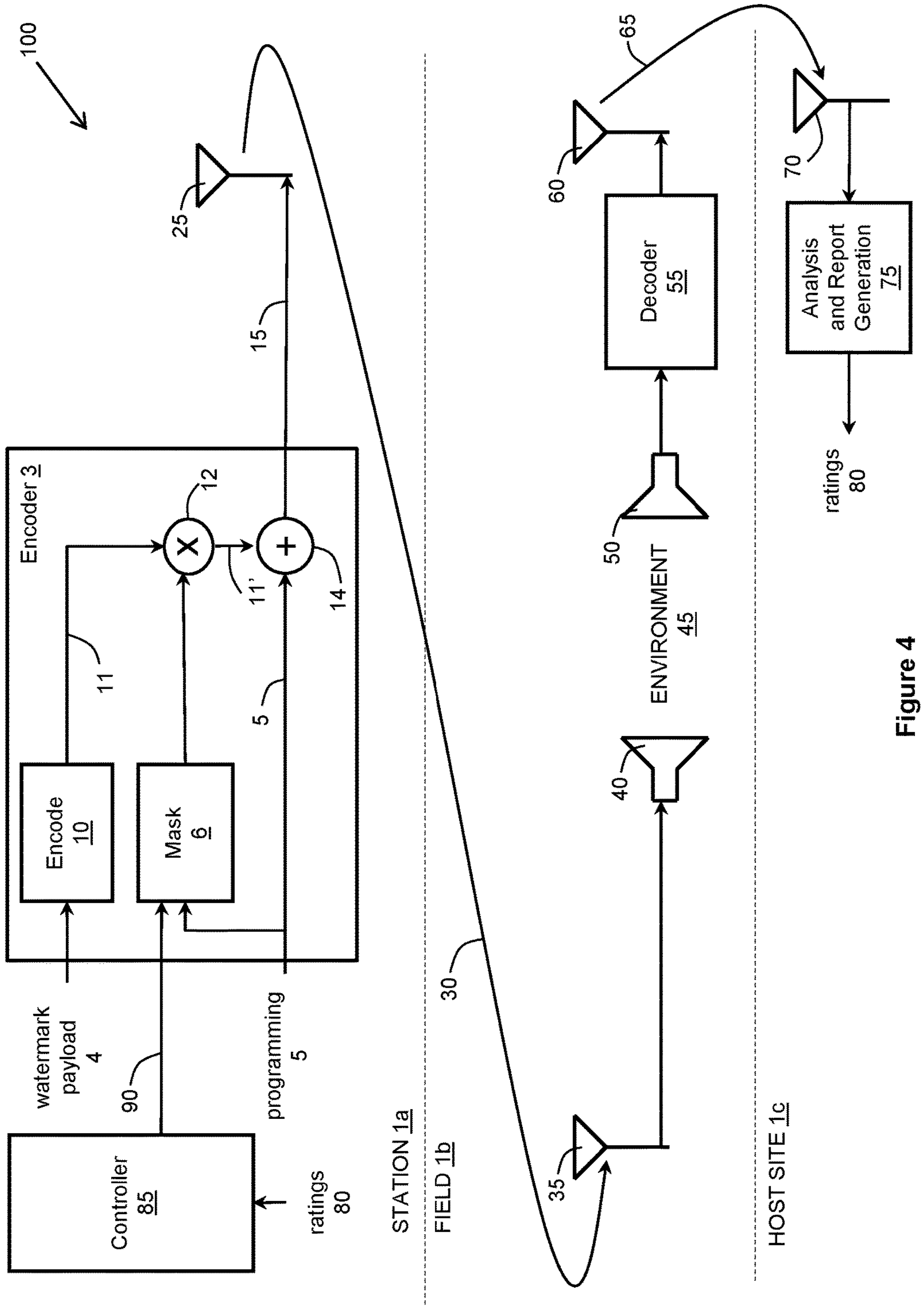
FIG. 4 illustrates a simplified block diagram of an exemplary system for optimizing parameters in deployed systems operating in delayed feedback, real world environments.

FIG. 4 illustrates a simplified block diagram of an exemplary system 100 for optimizing parameters in deployed systems operating in delayed feedback, real world environments. The system 100 is similar to the system 1 of FIG. 1 except that the system 100 includes controller 85, which the station can use to vary parameters of the masking analysis 6 such as, for example, the timing or energy at which the watermark signal 11 will be broadcasted.

At the highest level and as described in more detail below, the controller 85 behaves as a sequencer that via the control signal 90 varies the value of the selected parameter(s) of the encoder 3 and thus the masking analysis 6. Using the controller 85, the user selects a particular sequencing or toggling algorithm to control parameters of masking analysis 6. For example, the sequence may be Value 1 for odd minutes and Value 2 for even minutes (i.e., Value 1 for the first minute, Value 2 for the second minute, Value 1 for the third minute, Value 2 for the fourth minute, and so on.)

Although, in the illustrated embodiment, the control signal 90 is shown as a single connection, the control signal 90 may correspond to multiple connections. For example, general purpose input/output (GPIO) pins of the encoder 3 may be programmed to correspond to different parameters values. Using the controller 85 the user might set a first GPIO pin (e.g., pin 1) of the encoder 3 to become active on odd minutes, and a second GPIO pin (e.g., pin 2) to become active on even minutes. Or, with 4 pins, the user might set a sequencing as in pin 1 for the first minute, pin 2 for the second minute, pin 3 for the third minute and pin 4 for the fourth minute.

The controller 85 knows the time and date corresponding to each value prescribed by the controller 85 for the parameter(s) and therefore may keep a log of the date, time and value for every selected parameter value. The controller 85 stores this log information for later correlation to ratings 80.

Some days or weeks later, the rating data 80 arrives with a count of listeners for, for example, each minute slice. Like the ratings data 80, the log kept by the controller 85 contains the time and date divided in minute slices. Based on the date and time in the log kept by controller 85 and the date and time specified in the ratings data 80, the controller 85 may correlate changes in a parameter of the watermarking signal 11 (e.g., the watermarking energy) to ratings results.

Although, in the context of FIG. 4, the exemplary controller 85 is described as correlating the watermarking energy of the watermarking signal 11 to ratings, the controller 85 may correlate parameters of the watermarking signal 11 different from the watermarking energy to ratings or the controller 85 may correlate parameters of other components in the watermarking system such as, for example, the masking envelope time-constant, the symbol duration, etc. to ratings. In another embodiment, the controller 85 correlates to ratings parameters of a portion of the system 100 other than parameters directly relating to watermarking. For example, the controller 85 may correlate to ratings parameters of the programming 5 such as equalization settings, treble, bass, etc. or parameters of video or audio processors that produce the programming 5. In yet other embodiments, the controller 85 may be part of a system other than an audio or video system and, thus, the controller 85 may correlate changes in parameters of such another system to results or consequences of such changes.

In one embodiment, the controller 85, after correlating changes in a parameter to ratings, optimizes that parameter to maximize ratings. In one embodiment, the controller 85 optimizes the parameter to maximize ratings taking into account other factors (e.g., undesirable artifacts) or other parameters (i.e., multiple parameter optimization). In another embodiment, the controller 85 does not optimize parameters itself, but only produces a correlation such as that of FIG. 3 that a user or a separate machine may interpret to optimize parameters. This way, the controller 85 provides users (e.g., radio stations) a way to visualize the shape of the curve of FIG. 3 in order to optimally set parameters. This information would allow them to make a wise choice about increasing or decreasing one or more parameters.

Figure 5:
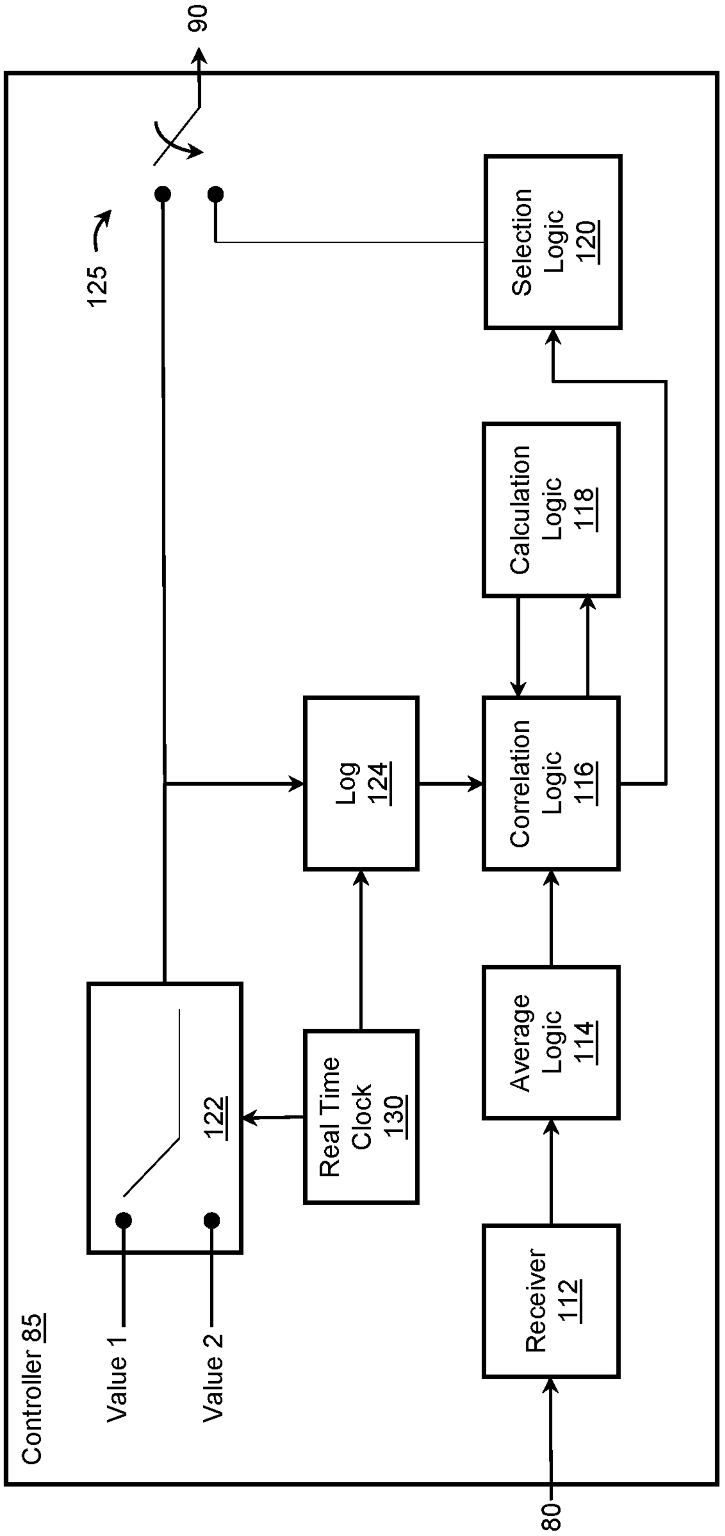
FIG. 5 illustrates a simplified block diagram of an exemplary controller of the system of FIG. 4.

FIG. 5 illustrates a block diagram of an exemplary controller 85. The controller 85 includes a time-sequence switch 122 that periodically (e.g., every minute), based on real time clock 130, changes a particular watermark parameter from Value 1 to Value 2. The controller 85 may include a switch 125 that may be set to connect the time-sequence switch 122 to the output of the controller 85 and thus the control signal 90. Although in the illustrated embodiment of FIG. 5, the time-sequence switch 122 is shown as actually selecting between parameter values Value 1 and Value 2, in another embodiment, the time-sequence switch 122 may simply provide an on/off or high/low sequence that instructs the encoder 3 (or whatever the controlled device happens to be) to switch parameter values in the order and at the time or rate indicated by the sequence.

In yet another embodiment, the control signal 90 may correspond to multiple connections or pins. For example, as described above, the switch 122 may set a first GPIO pin (e.g., pin 1) of the encoder 3 to become active on odd minutes, and a second GPIO pin (e.g., pin 2) to become active on even minutes. Or, with 4 pins, the switch 122 may set a sequence of pin 1 for the first minute, pin 2 for the second minute, pin 3 for the third minute, pin 4 for the fourth minute, and so on. The control signal 90 is provided to the encoder 3 or other device to switch parameter values in the order and time indicated by the sequence.

In summary, the controller 85 includes the time-sequence switch 122, which, during broadcasting of a radio transmission or for a time interval (e.g., one hour, one day, one week, etc.) rotates from a) setting a watermarking parameter to a first value for a first time period (e.g., to Value 1 for odd minutes), to b) setting the watermarking parameter to a second value, different from the first value, for a second time period subsequent the first time period (e.g., to Value 2 for even minutes) such that the broadcasting of the radio transmission includes multiple first time periods in which the watermarking parameter is set to the first value sequenced with multiple second time periods in which the watermarking parameter is set to the second value.

The controller 85 also includes the log 124. The clock 130 provides the time and date to the log 124. Therefore, the log 124 may save a log of the time and date with the corresponding parameter value prescribed by the switch 122 at that time and date. The log 124 stores this log information for later correlation to ratings data 80.

Some days or weeks later, the rating data 80 arrives with a count of listeners for, for example, each minute slice. Like the ratings data 80, the log kept by the log 124 contains the time and date corresponding to prescribed parameter values divided in minute slices.

The controller 85 includes the receiver 112 that receives the ratings data 80 corresponding to a radio transmission or a time interval (e.g., one week). Because of the time sequence (e.g., Value 1 for the first minute, Value 2 for the second minute, and so on) introduced by the controller 85 and specifically the switch 122, the ratings 80 for the radio transmission or the time interval effectively include a first set of ratings corresponding to the first time periods (e.g., the odd minutes) and a second set of ratings corresponding to the second time periods (e.g., the even minutes).

The controller 85 also includes an averaging logic 114 that averages the ratings data 80. In the example of FIG. 5, the averaging logic 114 averages the first set of ratings to arrive at a first average rating corresponding to the first time periods (e.g., the odd minutes) and averages the second set of ratings to arrive at a second average rating corresponding to the second time periods (e.g., the even minutes). How long to average the ratings data 80 is a function of noise suppression. In essence, the longer the averaging period, the narrower the bandwidth of the resulting low pass filter. Over time, the signal identifying the effect of each parameter value becomes clear.

The controller 85 also includes a correlation logic 116 that correlates the average rating to the corresponding parameter value. Based on the date and time in the log 124 and the date and time specified in the ratings data 80, the correlation logic may correlate parameter values (e.g., the watermarking energy) to ratings results. In the example of FIG. 5, the correlation logic 116 correlates the first average rating to the first value (Value 1) and the second average rating to the second value (Value 2). The result of the correlation may look like the curve of FIG. 3.

The controller 85 may also include the calculation logic 118 that, based on the results of the correlation logic 116, may calculate (e.g., extrapolate) points in the correlation curve. Calculation may be done to, for example, reduce the amount of time to construct the full curve of FIG. 3. Calculation may also be done to estimate points in the curve that the user or radio station does not wish to test because such test may introduce undesirable artifacts in the broadcasted audio.

The controller 85 may also include selection logic 120 that selects, based on the results of the correlation logic 116, an optimum value as the ongoing value for the parameter. For example, once the correlation logic 116 has "drawn" the curve of FIG. 3, the switch 125 may be set to connect the selection logic 120 to the control signal 90. The selection logic 120 may then select a value (e.g., Value 4) for the parameter as the optimum value based on FIG. 3 and other factors such as audibility, etc. In one embodiment, the selection logic 120 selects the value that provides the highest average rating as the ongoing value for the parameter. In another embodiment, the selection logic 120 selects the value based on a rate of change between various average ratings.

In one embodiment, the controller 85 does not include the selection logic 120. In this embodiment, a user may simply consult the curve "drawn" by the correlation logic 116 such as the curve of FIG. 3 to manually or otherwise select a proper value for the parameter.

Again, in the embodiment of FIG. 5, odd minutes might have the value Value 1 and even minutes the value Value 2. Over the course of an hour, there will be 30 measurements at each of these two values, which allows for computing an average of odd versus even minutes. During the hour, the other variables, such as vacation schedules of listeners or program content are likely to be, on average, static. Hence if the odd minute average is 120 listeners and the even minute average is 150 listeners, then we can assume statistically that the change in the parameter value moved us further up the curve of FIG. 3.

The same experiment with Value 3 and Value 4 of FIG. 3 shows a much small benefit since the total number of listeners increased only from 190 to 195. It is possible, moreover, that this incremental increase in listeners from 190 to 195 has the artifact of the parameter producing too much audio quality degradation (e.g., too much watermarking energy). In this case, the station is likely to conclude that the marginal benefit is not justified by the unpleasantness of the higher value parameter.

While small changes in a parameter (e.g., from Value 1 to Value 2) are likely to be undetectable by listeners, statistical averaging may detect even these small changes. Hence, the controller 85 provides an invisible or inaudible way of determining the shape of the curve of FIG. 3. In a meaningful way, the users of the watermarking system 100 can run carefully controlled scientific experiments and become masters of their own fate. The present invention, thus, moves the optimization process from the designer-manufacturer to the individual user or station.

While the discussion above used watermarking energy to illustrate one parameter, there are many other parameters that could use this approach, for example, the masking envelope time-constant, the symbol duration, etc.

The approach described above in respect to the switch 122, in which the switch 122 rotates between two values Value 1 and Value 2 of one parameter, may be extended to more than one parameter as shown in the table below:

| | | |
|---|---|---|
| Minute 1 | ParmA = value 1 | ParmB = value 3 |
| Minute 2 | ParmA = value 1 | ParmB = value 4 |
| Minute 3 | ParmA = value 2 | ParmB = value 3 |
| Minute 4 | ParmA = value 2 | ParmB = value 4 |

In this case, each of parameters ParmA and ParmB gets a different averaging. Over a one hour time interval, for example, ParmA may be averaged for minutes 1-2, 5-6, 9-10, etc. in comparison to the average for minutes 3-4, 7-8, 11-12, etc. ParmB would be averaged for odd and even minutes. This is just one example of applying multi-variable statistical techniques to the application or in-situ watermarking optimization. Thus, in this embodiment, the switch, during broadcasting of the radio transmission during the time interval (e.g., one hour), rotates between a) setting the first watermarking parameter to the first value (ParmA=value 1) and a second watermarking parameter to a third value (ParmB=value 3) for the first time period (e.g., minute 1), b) setting the first watermarking parameter to the first value (ParmA=value 1) and the second watermarking parameter to a fourth value, different from the third value, (ParmB=value 4) for a second time period (e.g., minute 2) subsequent the first time period, c) setting the first watermarking parameter to the second value (ParmA=value 2) and the second watermarking parameter to the third value (ParmB=value 3) for the third time period (e.g., minute 3) subsequent the second time period, and d) setting the first watermarking parameter to the second value (ParmA=value 2) and the second watermarking parameter to the fourth value (ParmB=value 4) for a fourth time period (e.g., minute 4) subsequent the third time period.

In this embodiment, the receiver 112 obtains the ratings 80 of the radio transmission including the first set of ratings corresponding to the first time periods, the second set of ratings corresponding to the second time periods, a third set of ratings corresponding to the third time periods, and a fourth set of ratings corresponding to the fourth time periods. The average logic 114 combines and averages the first set of ratings and the third set of ratings to arrive at a first value rating, combines and averages the second set of ratings and the fourth set of ratings to arrive at a second value rating, combines and averages the first set of ratings and the second set of ratings to arrive at a third value rating, and combines and averages the third set of ratings and the fourth set of ratings to arrive at a fourth value rating. The correlation logic 116 may then correlate the first value rating to the first value, the second value rating to the second value, the third value rating to the third value, and the fourth value rating to the fourth value.

In another embodiment, a given parameter can be time sequenced over three or more values, which effectively is sampling the curve to a higher order. With two point sequencing the results give a measure of the curve slope. With three point sequencing, we can obtain a parabolic approximation of the curve.

Figure 6:
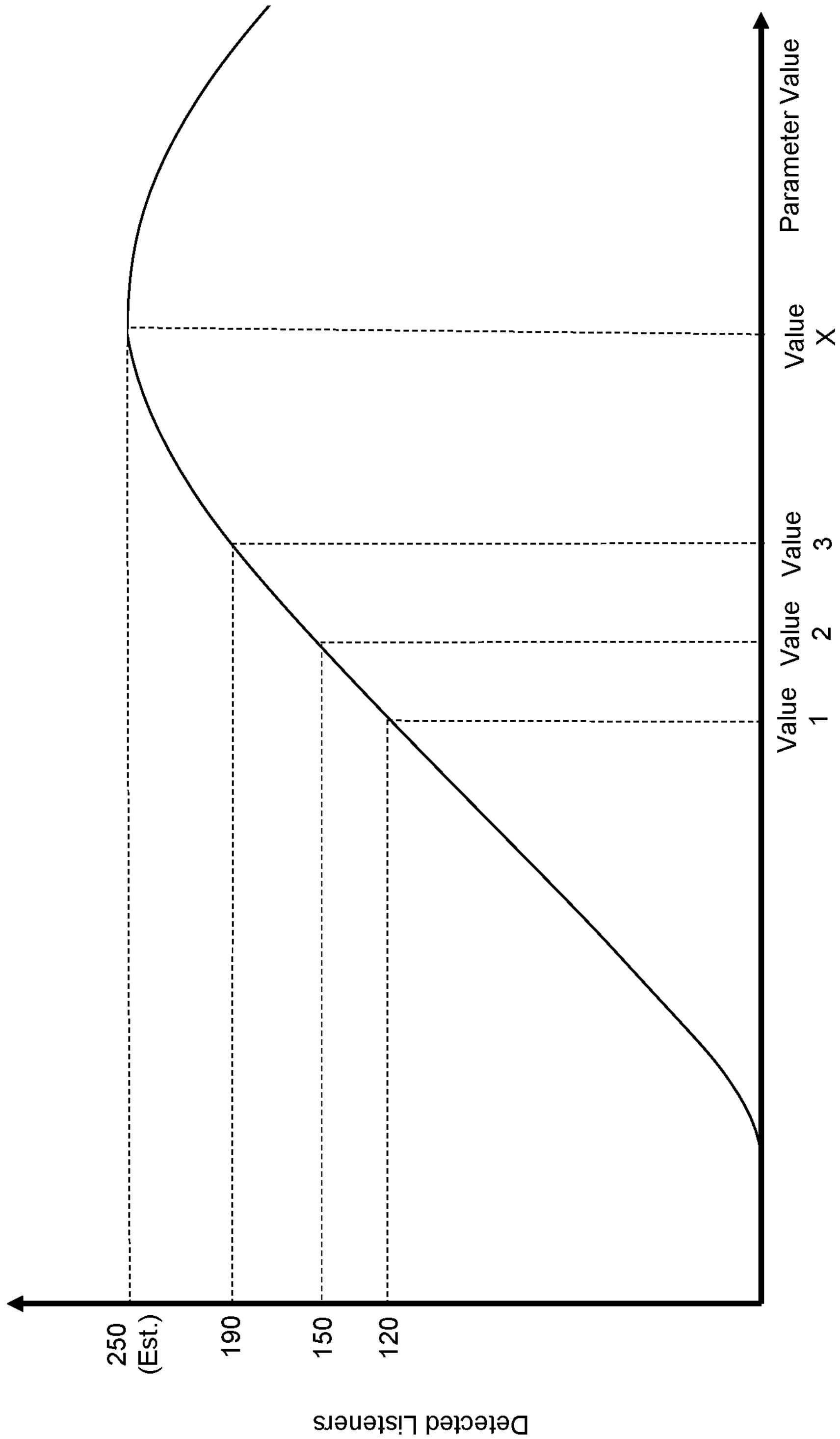
FIG. 6 illustrates an exemplary curve illustrating a parabolic extrapolation predicting the peak number of listeners for values of the parameter.

FIG. 6 illustrates an exemplary curve illustrating a parabolic extrapolation predicting the peak number of listeners for values of a parameter. As illustrated in FIG. 6, the calculation logic 118 of FIG. 5 may also include a peak logic that calculates a peak average rating and a corresponding peak parameter value based on results of the correlation logic 116. For example, based on the rate a change of the curve of FIG. 6 from Value 1 to Value 2 and the rate of change from Value 2 to Value 3, the calculation logic 118 may calculate (e.g., extrapolate, intrapolate, etc.) that a Value X would produce the peak average rating of 250 detected listeners. FIG. 6 shows how a parabolic extrapolation predicts that the peak number of listeners would appear if the parameter value is set to Value X. The parabolic curve reaches an estimated peak of 250 listeners at Value X.

As described above, this actually allows the calculation of the peak number without actually running the parameter to a very high value. In this embodiment, the switch 122, during broadcasting of the radio transmission, rotates between a) setting the watermarking parameter to the first value for the first time period, b) setting the watermarking parameter to the second value, different from the first value, for the second time period subsequent the first time period, and c) setting the watermarking parameter to a third value, different from the second value, for a third time period subsequent the second time period such that the broadcasting of the radio transmission includes multiple first time periods in which the watermarking parameter is set to the first value sequenced with multiple second time periods in which the watermarking parameter is set to the second value sequenced with multiple third time periods in which the watermarking parameter is set to the third value.

The receiver 112 obtains the ratings 80 of the radio transmission including the first set of ratings corresponding to the first time periods, the second set of ratings corresponding to the second time periods, and a third set of ratings corresponding to the third time periods. The average logic 114 averages the first set of ratings to arrive at the first average rating corresponding to the first time periods, the second set of ratings to arrive at the second average rating corresponding to the second time periods, and the third set of ratings to arrive at a third average rating corresponding to the third time periods. The correlation logic 116 may then correlate the first average rating to the first value, the second average rating to the second value, and the third average rating to the third value.

Figure 7:
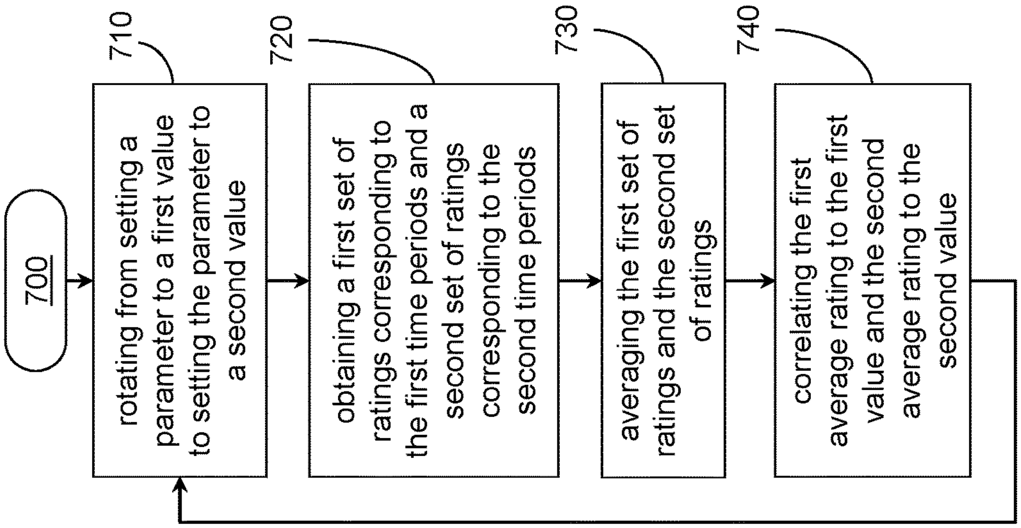
FIG. 7 illustrates a flow diagram for an exemplary method for optimizing parameters in deployed systems operating in delayed feedback, real world environments.

Exemplary methods may be better appreciated with reference to the flow diagram of FIG. 7. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology. Furthermore, additional methodologies, alternative methodologies, or both can employ additional blocks, not illustrated.

In the flow diagram, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIG. 7 illustrates a flow diagram for an exemplary method 700 for determining effect of changes in parameters. The method 700 includes, at 710, during a time interval, rotating from a) setting a first parameter to a first value for a first time period, to b) setting the first parameter to a second value, different from the first value, for a second time period subsequent the first time period such that the time interval includes multiple first time periods in which the first parameter is set to the first value sequenced with multiple second time periods in which the first parameter is set to the second value. At 720, the method 700 includes obtaining, for the time interval, a first set of ratings corresponding to the first time periods and a second set of ratings corresponding to the second time periods. At 730, the method 700 includes averaging, for the time interval, the first set of ratings to arrive at a first average rating corresponding to the first time periods and averaging, for the time interval, the second set of ratings to arrive at a second average rating corresponding to the second time periods. At 740, the method 700 includes correlating the first average rating to the first value and the second average rating to the second value.

In one embodiment, the method 700 includes selecting one of the first value or the second value as the ongoing value for the parameter.

While FIG. 7 illustrates various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other exemplary methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

Figure 8:
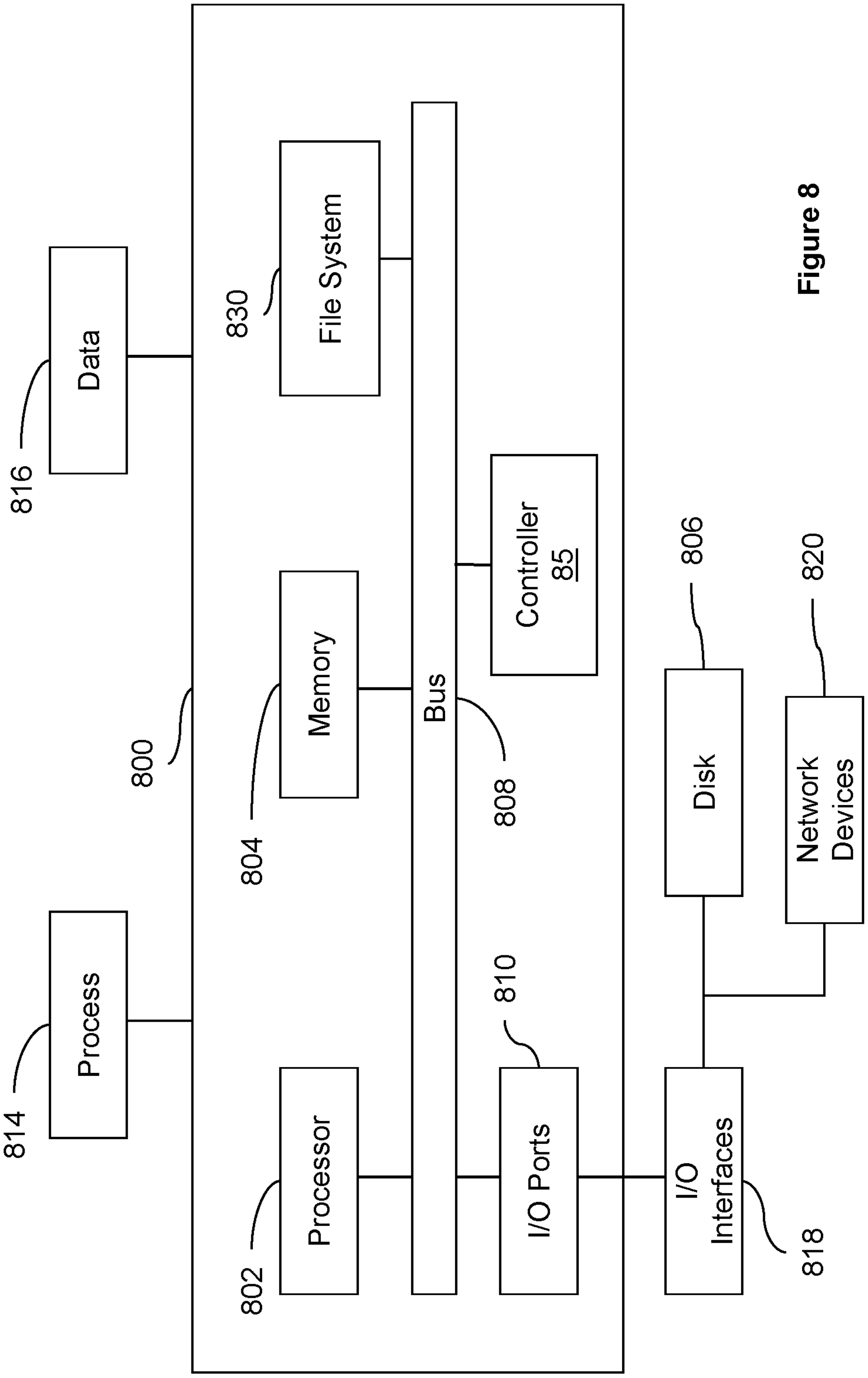
FIG. 8 illustrates a block diagram of an exemplary device for optimizing parameters in deployed systems operating in delayed feedback, real world environments.

FIG. 8 illustrates a block diagram of an exemplary device 800 for optimizing parameters in deployed systems operating in delayed feedback, real world environments. The device 800 includes a processor 802, a memory 804, and I/O Ports 810 operably connected by a bus 808.

In one example, the device 800 may include an controller 85 that includes a time-sequence switch 122, which, during broadcasting of a radio transmission and for a time interval (e.g., one hour, one day, one week, etc.) rotates from a) setting a watermarking parameter to a first value for a first time period (e.g., to Value 1 for odd minutes), to b) setting the watermarking parameter to a second value, different from the first value, for a second time period subsequent the first time period (e.g., to Value 2 for even minutes) such that the broadcasting of the radio transmission includes multiple first time periods in which the watermarking parameter is set to the first value sequenced with multiple second time periods in which the watermarking parameter is set to the second value. The controller 85 also includes a receiver 112 that receives the ratings 80 corresponding to the radio transmission or the time interval (e.g., one week). The controller 85 also includes an averaging logic 114 that averages the first set of ratings to arrive at a first average rating corresponding to the first time periods (e.g., the odd minutes) and averaging the second set of ratings to arrive at a second average rating corresponding to the second time periods (e.g., the even minutes). The controller 85 also includes a correlation logic 116 that correlates the first average rating to the first value and the second average rating to the second value. The controller 85 may also include the calculation logic 118 that, based on the results of the correlation logic 116, may calculate (e.g., extrapolate) points in the correlation curve.

The controller 85 may also include selection logic 120 that selects, based on the results of the correlation logic 116, an optimum value as the ongoing value for the parameter. In one embodiment, the selection logic 120 selects the value that provides a higher average rating as the ongoing value for the parameter. In another embodiment, the selection logic 120 selects the value based on a rate of change between various average ratings.

Thus, the controller 85 including the various logics comprised therein may be implemented in device 800 as hardware, firmware, software, or a combination thereof and may provide means for sequence switching, receiving ratings, averaging ratings, correlating, calculating, selecting and parameter modifying as described herein.

The processor 802 can be a variety of various processors including dual microprocessor and other multi-processor architectures. The memory 804 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 806 may be operably connected to the device 800 via, for example, an I/O Interfaces (e.g., card, device) 818 and an I/O Ports 810. The disk 806 can include, but is not limited to, devices like a magnetic disk drive, a solid state disk drive, a floppy disk drive, a tape drive, a Zip drive, a flash memory card, or a memory stick. Furthermore, the disk 806 can include optical drives like a CD-ROM, a CD recordable drive (CD-R drive), a CD rewriteable drive (CD-RW drive), or a digital video ROM drive (DVD ROM). The memory 804 can store processes 814 or data 816, for example. The disk 806 or memory 804 can store an operating system that controls and allocates resources of the device 800.

The bus 808 can be a single internal bus interconnect architecture or other bus or mesh architectures. While a single bus is illustrated, it is to be appreciated that device 800 may communicate with various devices, logics, and peripherals using other busses that are not illustrated (e.g., PCIE, SATA, Infiniband, 1394, USB, Ethernet). The bus 808 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The device 800 may interact with input/output devices via I/O Interfaces 818 and I/O Ports 810. Input/output devices can include, but are not limited to, a keyboard, a microphone, a pointing and selection device, cameras, video cards, displays, disk 806, network devices 820, and the like. The I/O Ports 810 can include but are not limited to, serial ports, parallel ports, and USB ports.

The device 800 can operate in a network environment and thus may be connected to network devices 820 via the I/O Interfaces 818, or the I/O Ports 810. Through the network devices 820, the device 800 may interact with a network. Through the network, the device 800 may be logically connected to remote computers. The networks with which the device 800 may interact include, but are not limited to, a local area network (LAN), a wide area network (WAN), and other networks. The network devices 820 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 820 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

"Data store," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Signal," as used herein, includes but is not limited to one or more electrical or optical signals, analog or digital signals, data, one or more computer or processor instructions, messages, a bit or bit stream, or other means that can be received, transmitted, or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A machine or group of machines for determining effect of changes in parameters in a system for optimizing the parameters, the machine or group of machines comprising:

a time-sequence switch configured to, during a time interval, rotate from a) setting a first parameter to a first value for a first time period, to b) setting the first parameter to a second value, different from the first value, for a second time period subsequent the first time period such that the time interval includes a time sequence with multiple first time periods in which the first parameter is set to the first value sequenced with multiple second time periods in which the first parameter is set to the second value;

a receiver configured to receive, for the time interval, a first set of ratings corresponding to the first time periods and a second set of ratings corresponding to the second time periods;

a processor comprising an averaging logic configured to average, for the time interval, the first set of ratings to arrive at a first average rating corresponding to the first time periods and averaging, for the time interval, the second set of ratings to arrive at a second average rating corresponding to the second time periods;

the processor or a second processor comprising a correlation logic configured to correlate the first average rating to the first value and the second average rating to the second value, the processor, the second processor, or a third processor comprising a selection logic configured to select one of the first value or the second value as the ongoing value for the parameter based on which of the first average rating or the second average rating is higher; and an output switch operably connected to the time-sequence switch and the selection logic and configured to operably connect the time-sequence switch or the selection logic to an output of a controller to produce the time sequence or the ongoing value as a control signal.

2. The machine or group of machines of claim 1, comprising:

the processor, the second processor, or a third processor comprising a selection logic configured to select one of the first value or the second value as the ongoing value for the parameter based on a rate of change between the first average rating and the second average rating.

3. The machine or group of machines of claim 1, comprising:

the processor, the second processor, or a third processor comprising a peak logic configured to calculate a peak average rating and a corresponding optimal parameter value based on the first average rating and the second average rating.

4. The machine or group of machines of claim 1, comprising:

the switch configured to, during the time interval, rotate between a) setting the parameter to the first value for the first time period, b) setting the parameter to the second value for the second time period, and c) setting the parameter to a third value, different from the first and the second value, for a third time period subsequent the second time period such that the time interval includes multiple first time periods in which the parameter is set to the first value sequenced with multiple second time periods in which the parameter is set to the second value sequenced with multiple third time periods in which the parameter is set to the third value;

the receiver configured to receive, for the time interval, the first set of ratings corresponding to the first time periods, the second set of ratings corresponding to the second time periods, and a third set of ratings corresponding to the third time periods;

the averaging logic configured to average the first set of ratings to arrive at the first average rating corresponding to the first time periods, averaging the second set of ratings to arrive at the second average rating corresponding to the second time periods, and averaging the third set of ratings to arrive at a third average rating corresponding to the third time periods; and the correlation logic configured to correlate the first average rating to the first value, the second average rating to the second value, and the third average rating to the third value.

5. The machine or group of machines of claim 4, comprising:

the processor, the second processor, or a third processor comprising a selection logic configured to select one of the first value, the second value or the third value as the ongoing value for the parameter based on which of the first average rating, the second average rating, or the third average rating is higher.

6. The machine or group of machines of claim 4, comprising:

the processor, the second processor, or a third processor comprising a selection logic configured to select one of the first value, the second value or the third value as the ongoing value for the parameter based on a difference between a) a rate of change between the first average rating and the second average rating and b) a rate of change between the second average rating and the third average rating.

7. The machine or group of machines of claim 4, comprising:

the processor, the second processor, or a third processor comprising a peak logic configured to calculate a peak average rating and a corresponding optimal parameter value 1) based on the first average rating, the second average rating and the third average rating or 2) based on a difference between a) a rate of change between the first average rating and the second average rating and b) a rate of change between the second average rating and the third average rating.

8. The machine or group of machines of claim 1, wherein the parameter is a first parameter, the machine or group of machines comprising:

the time-sequence switch configured to, during the time interval, rotate between a) setting the first parameter to the first value and a second parameter to a third value for the first time period, b) setting the first parameter to the second value and the second parameter to the third value for the second time period, c) setting the first parameter to the first value and the second parameter to a fourth value, different from the third value, for a third time period subsequent the second time period, and d) setting the first parameter to the second value and the second parameter to the fourth value for a fourth time period subsequent the third time period;

the receiver configured to receive, for the time interval, the first set of ratings corresponding to the first time periods, the second set of ratings corresponding to the second time periods, a third set of ratings corresponding to the third time periods, and a fourth set of ratings corresponding to the fourth time periods;

the averaging logic configured to combine and average the first set of ratings and the third set of ratings to arrive at a first value rating, combine and average the second set of ratings and the fourth set of ratings to arrive at a second value rating, combine and average the first set of ratings and the second set of ratings to arrive at a third value rating, combine and average the third set of ratings and the fourth set of ratings to arrive at a fourth value rating; and the correlating logic configured to correlate the first value rating to the first value, the second value rating to the second value, the third value rating to the third value, and the fourth value rating to the fourth value.

9. The machine or group of machines of claim 8, comprising:

the processor, the second processor, or a third processor comprising a selection logic configured to select one of the first value or the second value as the ongoing value for the first parameter based on which of the first value rating or the second value rating is higher, and one of the third value or the fourth value as the ongoing value for the second parameter based on which of the third value rating or the fourth value rating is higher.

10. The machine or group of machines of claim 8, comprising:

the processor, the second processor, or a third processor comprising a selection logic configured to select one of the first value or the second value as the ongoing value for the first parameter based on a rate of change between the first value rating and the second value rating, and one of the third value or the fourth value as the ongoing value for the second parameter based on a rate of change between the third value rating and the fourth value rating.

11. The machine or group of machines of claim 8, comprising:

the processor, the second processor, or a third processor comprising a peak logic configured to calculate a peak first parameter rating and a corresponding optimal first parameter value based on the first value rating and the second value rating, and a peak second parameter rating and a corresponding optimal second parameter value based on the third value rating and the fourth value rating.

12. The machine or group of machines of claim 8, comprising:

the processor, the second processor, or a third processor comprising a peak logic configured to calculate a peak rating and corresponding optimal first parameter value and optimal second parameter value based on the first value rating, the second value rating, the third value rating and the fourth value rating.

13. A method for a machine or group of machines to determine effect of changes in parameters in a system to optimize the parameters, the method comprising:

during a time interval, operating a time-sequence switch to rotate from a) setting a first parameter to a first value for a first time period, to b) setting the first parameter to a second value, different from the first value, for a second time period subsequent the first time period such that the time interval includes a time sequence with multiple first time periods in which the first parameter is set to the first value sequenced with multiple second time periods in which the first parameter is set to the second value;

obtaining, for the time interval, a first set of ratings corresponding to the first time periods and a second set of ratings corresponding to the second time periods;

averaging, for the time interval, the first set of ratings to arrive at a first average rating corresponding to the first time periods and averaging, for the time interval, the second set of ratings to arrive at a second average rating corresponding to the second time periods;

correlating the first average rating to the first value and the second average rating to the second value;

selecting one of the first value or the second value as the ongoing value for the parameter based on which of the first average rating or the second average rating is higher, and operating an output switch to produce the time sequence or the ongoing value as a control signal.

14. The method of claim 13, comprising:

selecting one of the first value or the second value as the ongoing value for the parameter based on a rate of change between the first average rating and the second average rating.

15. The method of claim 13, comprising:

calculating a peak average rating and a corresponding optimal parameter value based on the first average rating and the second average rating.

16. The method of claim 13, comprising:

during the time interval, rotating between a) setting the parameter to the first value for the first time period, b) setting the parameter to the second value for the second time period, and c) setting the parameter to a third value, different from the first and the second value, for a third time period subsequent the second time period such that the time interval includes multiple first time periods in which the parameter is set to the first value sequenced with multiple second time periods in which the parameter is set to the second value sequenced with multiple third time periods in which the parameter is set to the third value;

obtaining, for the time interval, the first set of ratings corresponding to the first time periods, the second set of ratings corresponding to the second time periods, and a third set of ratings corresponding to the third time periods;

averaging the first set of ratings to arrive at the first average rating corresponding to the first time periods, averaging the second set of ratings to arrive at the second average rating corresponding to the second time periods, and averaging the third set of ratings to arrive at a third average rating corresponding to the third time periods; and correlating the first average rating to the first value, the second average rating to the second value, and the third average rating to the third value.

17. The method of claim 16, comprising:

selecting one of the first value, the second value or the third value as the ongoing value for the parameter based on which of the first average rating, the second average rating, or the third average rating is higher.

18. The method of claim 16, comprising:

selecting one of the first value, the second value or the third value as the ongoing value for the parameter based on a difference between a) a rate of change between the first average rating and the second average rating and b) a rate of change between the second average rating and the third average rating.

19. The method of claim 16, comprising:

calculating a peak average rating and a corresponding optimal parameter value 1) based on the first average rating, the second average rating and the third average rating or 2) based on a difference between a) a rate of change between the first average rating and the second average rating and b) a rate of change between the second average rating and the third average rating.

20. The method of claim 13, wherein the parameter is a first parameter, the method comprising:

during the time interval, rotating between a) setting the first parameter to the first value and a second parameter to a third value for the first time period, b) setting the first parameter to the second value and the second parameter to the third value for the second time period, c) setting the first parameter to the first value and the second parameter to a fourth value, different from the third value, for a third time period subsequent the second time period, and d) setting the first parameter to the second value and the second parameter to the fourth value for a fourth time period subsequent the third time period;

obtaining, for the time interval, the first set of ratings corresponding to the first time periods, the second set of ratings corresponding to the second time periods, a third set of ratings corresponding to the third time periods, and a fourth set of ratings corresponding to the fourth time periods;

combining and averaging the first set of ratings and the third set of ratings to arrive at a first value rating, combining and averaging the second set of ratings and the fourth set of ratings to arrive at a second value rating, combining and averaging the first set of ratings and the second set of ratings to arrive at a third value rating, and combining and averaging the third set of ratings and the fourth set of ratings to arrive at a fourth value rating; and correlating the first value rating to the first value, the second value rating to the second value, the third value rating to the third value, and the fourth value rating to the fourth value.

21. The method of claim 20, comprising:

selecting one of the first value or the second value as the ongoing value for the first parameter based on which of the first value rating or the second value rating is higher, and selecting one of the third value or the fourth value as the ongoing value for the second parameter based on which of the third value rating or the fourth value rating is higher.

22. The method of claim 20, comprising:

selecting one of the first value or the second value as the ongoing value for the first parameter based on a rate of change between the first value rating and the second value rating, and selecting one of the third value or the fourth value as the ongoing value for the second parameter based on a rate of change between the third value rating and the fourth value rating.

23. The method of claim 20, comprising:

calculating a peak first parameter rating and a corresponding optimal first parameter value based on the first value rating and the second value rating, and calculating a peak second parameter rating and a corresponding optimal second parameter value based on the third value rating and the fourth value rating.

24. The method of claim 20, comprising:

calculating a peak rating and corresponding optimal first parameter value and optimal second parameter value based on the first value rating, the second value rating, the third value rating and the fourth value rating.

* * * * *